No. 827,920. PATENTED AUG. 7, 1906.
W. A. KITTS.
STEAM METER.
APPLICATION FILED AUG. 26, 1905.
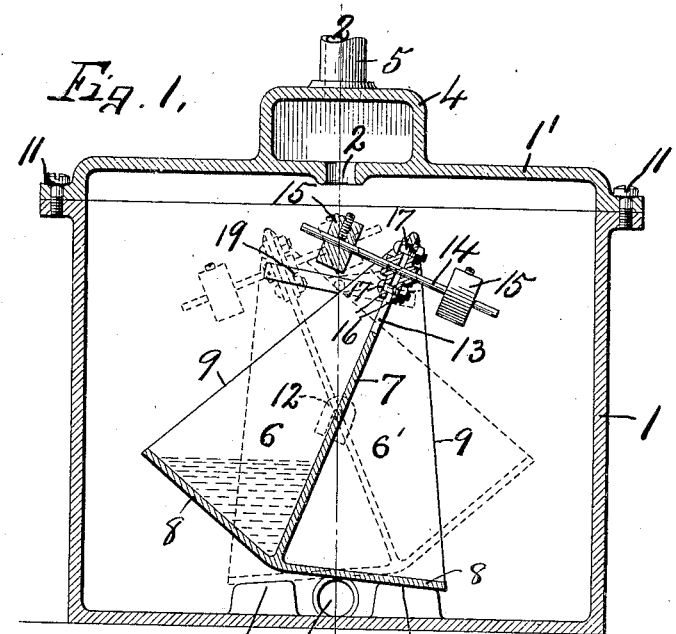
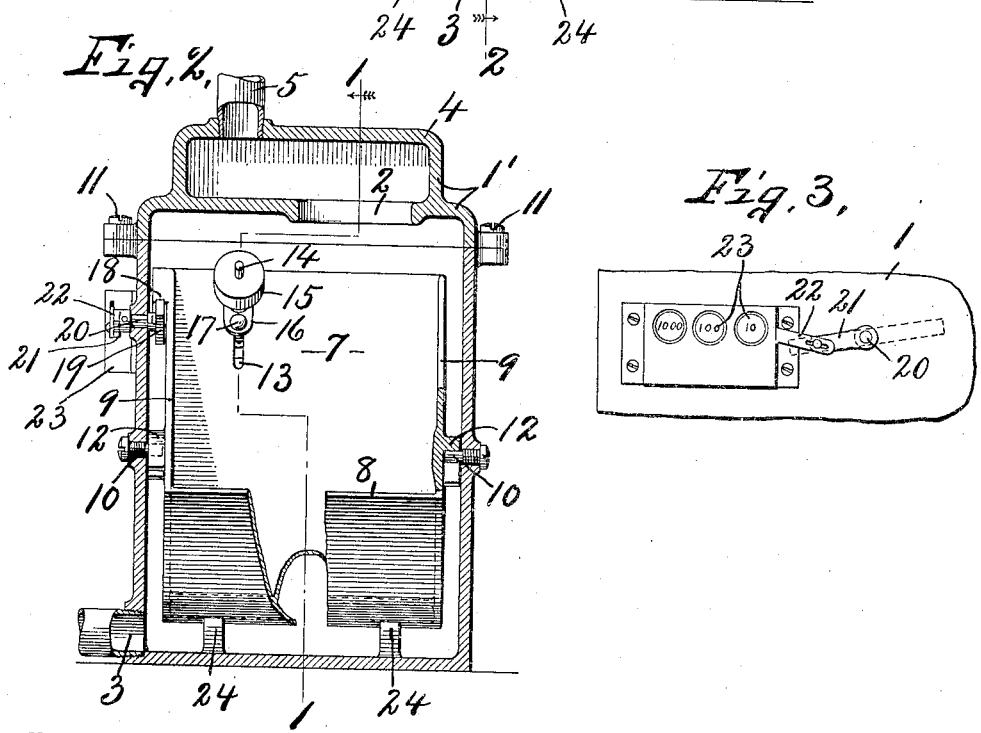
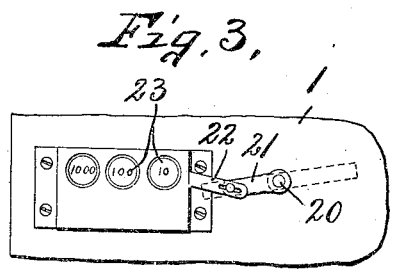
WITNESSES:
B. E. Robinson
H. E. Chase
INVENTOR:
Willard A. Kitts
BY
Howard P. Denison
ATTORNEY.
THE NORRIS PETERS CO., WASHINGTON, D. C.

UNITED STATES PATENT OFFICE.

WILLARD A. KITTS, OF OSWEGO, NEW YORK, ASSIGNOR TO KITTS MANUFACTURING COMPANY, OF OSWEGO, NEW YORK, A CORPORATION OF NEW YORK.

STEAM-METER.

No. 827,920.   Specification of Letters Patent.   Patented Aug. 7, 1906.

Application filed August 26, 1905. Serial No. 275,895.

*To all whom it may concern:*

Be it known that I, WILLARD A. KITTS, of Oswego, in the county of Oswego, in the State of New York, have invented new and useful Improvements in Steam-Meters, of which the following, taken in connection with the accompanying drawings, is a full, clear, and exact description.

This invention relates to improvements in steam-meters in which the quantity of steam used is measured by the weight or volume of water of condensation accumulating from such steam and collected at a suitable place of discharge.

My object is to provide a movable receptacle for the water of condensation, whereby the accumulation of a predetermined quantity of such water actuates the receptacle to discharge the water therefrom and at the same time to operate a counter, whereby the number of operations of such receptacle is automatically registered. In other words, I have sought to utilize this water of condensation, which represents a definite quantity of steam, for the purpose of automatically discharging itself when reaching a predetermined weight or quantity and simultaneously and automatically registering each discharge, so that when the register is examined the exact volume of water which has passed through the meter may be accurately determined, thereby enabling the inspector to determine the exact amount of steam used in any part of the system or portion of a system of steam distribution.

Another object is to provide means for adjusting or regulating the operation of the movable parts of the device, so as to make the intervals of operation dependent upon the volume of water in the receptacle, or, in other words, to gage the operation according to the capacity of the receptacle, so as to avoid any possibility of overflow or undue escape of water from either of the receptacles.

Other objects relating to the specific structural details will be brought out in the following description.

In the drawings, Figures 1 and 2 are sectional views taken, respectively, on lines 1 1 of Fig. 2 and 2 2 of Fig. 1. Fig. 3 is a face view of the counter and its operating-arm.

In carrying out the objects stated I provide a closed casing or trap 1 with an elongated inlet 2 in its top and an outlet 3 in one side near the bottom, the inlet being inclosed or capped by a suitable hood 4, having an inlet-conduit 5, which may be connected to any steam heating or power system or to any part of such system where it may be desirable to ascertain the quantity of steam actually used. For instance, the pipe 5 may be connected in the return-flow pipe of a radiator or to any other pipe or conduit receiving the water of condensation from the whole or any part of a steam-distributing system.

The inlet-pipe 5 is preferably located at one side or end of the opening 2, so as to allow the water of condensation to drop first upon the underlying shelf or top of the casing 1, from which it drips gradually into the opening 2, and thus into one or the other of the two underlying pockets or receptacles 6 and 6', which are located within the casing 1 directly beneath the opening 2. These pockets 6 and 6' are of substantially the same form and size or capacity and are arranged back to back, with their open sides facing in opposite directions, being separated by a substantially upright partition 7 and are each provided with a bottom 8 and opposite ends 9. The bottom 8 and central partition 7 are disposed at an acute angle with each other and, together with the ends, constitute an oscillatory receptacle, which is pivotally supported substantially midway between its top and bottom upon suitable trunnions 10 in the sides of the casing 1.

The top, as 1', of the casing 1 is removable and is held in place by clamping-screws 11, and the underlying water-receptacle or oscillatory frame is provided with bearings 12, open at their lower sides for receiving the pivotal pins or trunnions 10 and allowing the whole device—that is, the oscillatory frame having the pockets 6 and 6'—to be lifted bodily and removed through the upper side of the casing when the top 1' is removed, so that the casing and oscillatory frame may be manufactured separately and readily assembled when desired.

The opposed edges of the ends 9 of the pockets 6 and 6' converge upwardly, so that the upper ends of the pockets are comparatively shallow in the direction of oscillation, and therefore the general appearance of the frame in end view is nearly triangular or that of an isosceles triangle with its apex at the top and the central portion of its base somewhat depressed or dished downwardly to retain the water in one or the other of the pockets, according to the position of the oscillatory frame.

The central partition 7, dividing the pockets 6 and 6' one from the other, is provided near its top above the pivot 10 with a vertical slot 13, through which is passed a shaft or spindle 14, carrying opposite weights 15 and adjustably held in place by clamping-plates 16 and bolts 17, the clamping-plates 16 forming bearings for the spindle or rod 14, and the bolts 17 are passed through the slot 13 to clamp the plates 16 against the opposite faces of the partition 7. The object of this slot or vertical adjustment of the weight-supporting shaft or rod 14 is to regulate the automatic oscillation of the buckets 6 and 6' according to the volume of water which may be in one of the pockets, so that the buckets will remain in a certain position to receive and retain a predetermined quantity of water without overflowing, and after such predetermined quantity is deposited into one of the pockets its own weight will immediately overcome the weights 15 and rock the buckets to the extreme opposite position, in which position the water will be discharged from the pocket and will then escape through the outlet 3 to the waste-pipe. (Not shown.) In other words, the buckets in which the pockets 6 and 6' are formed are counterbalanced by the weights 15, and by moving these weights or adjusting them toward and from the swinging axis of the bucket-frame a greater or less quantity of water in one of the buckets or pockets will be required to overcome the weight of the counterbalances 15, under which conditions the bucket-frame is automatically tilted or rocked by the weight of the water in one of the pockets which may be in position to receive the drip through the opening 2 until the other pocket is brought into position to receive such drip, and the water in the first-named pocket is automatically discharged into the bottom of the receptacle 1, from which it escapes through the opening or outlet 3. This automatic regulation of the operation of the bucket-frame may also be effected by adjusting the weights 15 toward and from the central partition 7 along the rod or spindle 14, as is clearly evident upon reference to Fig. 1.

Secured to one side or end of the bucket-frame some distance above its swinging axis is a cam face or shoulder 18, which engages and operates a rock-arm 19 on the adjacent end or side of the inclosing case 1, said rock-arm being mounted upon a rock-shaft 20, which in turn is provided with a crank-arm 21 in operative engagement with a counter-arm 22 of a counter 23.

The rock-arm 19 projects substantially equidistant at each side of its axis 20, thereby constituting two arms, one of which is engaged by the shoulder 18 when the bucket-frame is rocked in one direction and the other is similarly engaged and depressed by said shoulder when the bucket-frame is rocked in the opposite direction, and each movement of the rock-arm in either direction registers such movement in the counter 23. This counter is placed upon the outside of the casing, where it may be readily seen and the registrations noted.

In operation the water of condensation is caused to flow or drip into the conduit 5 and onto the top 1' within the inclosure 4, from which it flows or drips through the opening 2 into one of the underlying pockets 6 or 6' which may be in registration with said opening 2. The counterbalances 15 are adjusted to hold the bucket-frame in a certain position—that is, with one of the pockets 6 or 6' in position to receive the drip from the opening 2—until a predetermined quantity of water—say one cubic foot—is deposited in the underlying pocket, whereupon the weight of such predetermined quantity overcomes the counterbalancing effect of the weights 15, thereby rocking the bucket-frame to the other extreme with the other pocket in position to receive the same predetermined quantity of water. The pivotal axis of the bucket-frame is in a vertical line passing through the center of the opening 2, and the upper end of the partition 7 is movable to opposite sides of said vertical line as the bucket-frame is rocked to its extreme positions, the degree of movement of the bucket-frame being limited by stops 24, which rise from the bottom of the casing 1 and are engaged by the bottoms 8 of the pockets 6 and 6' as the bucket-frame is rocked in either direction. In Fig. 1 I have shown the pocket 6 as nearly filled and about ready to automatically swing the frame to the position shown by dotted lines, during which operation the water in the bucket 6 is emptied into the bottom of the receptacle 1 and discharges therefrom through the conduit 3. This action of discharging the bucket 6 throws the counterbalances 15 and upper end of the partition 7 to the opposite side of the vertical line of the bucket-frame, thereby bringing the bucket 6' into position to receive the drip from the opening 2 and cutting off communication with the bucket 6, and as soon as the bucket 6' is filled nearly to the point of overflowing or to any other predetermined degree it is automatically rocked back by such weight to the first position to discharge such water into the bottom of the receptacle 1. At each movement of the bucket-frame in either direction the arm 19 is actuated to register such movement in the counter 23, which may be of any well-known construction capable of indicating or registering the successive movements of the bucket-frame.

Having thus fully described my invention, what I claim, and desire to secure by Letters Patent, is—

1. In a meter for measuring condensed steam, the combination of a closed trap having an inlet in its top and an outlet near its bottom, said trap having a hood on its top covering said inlet, a pipe leading into said hood above and laterally of the inlet in the top of the casing, a frame disposed within the casing, said frame being formed with two pockets, each pocket being provided with an obliquely-disposed bottom and opposite ends and separated by a substantially vertical partition and said frame being formed with bearings at opposite sides, pins passing through the sides of the casing and seating in the bearings of the frame, a rod passing through said partition near the upper end thereof and adjustable weights carried on said rod.

2. In a meter for measuring condensed steam the combination with a closed casing having an inlet in its top and an outlet near its bottom, of a substantially triangular one-piece frame, said frame having a vertical central partition, side walls and a bottom, said partition dividing the frame into two receptacles, bearings formed integral with the frame at the sides thereof, pivot-pins passing through the walls of the casing, said bearings seating on said pivot-pins, said partition being formed with a slot in its upper end, a rod passing through said slot, a weight carried on each end of said rod, clamping-plates forming bearings for said rod and embracing said partition and bolts passing through said clamping-plates and through said slot in the partition.

In witness whereof I have hereunto set my hand on this 24th day of August, 1905.

WILLARD A. KITTS.

Witnesses:
H. E. CHASE,
HOWARD P. DENISON.